(12) United States Patent
Simopoulos et al.

(10) Patent No.: US 7,682,311 B2
(45) Date of Patent: Mar. 23, 2010

(54) PHASE UNWRAPPED VELOCITY DISPLAY FOR ULTRASOUND MEDICAL IMAGING

(75) Inventors: Constantine Simopoulos, San Francisco, CA (US); Kutay F. Ustuner, Mountain View, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 352 days.

(21) Appl. No.: 11/233,550

(22) Filed: Sep. 22, 2005

(65) Prior Publication Data

US 2007/0066896 A1    Mar. 22, 2007

(51) Int. Cl.
*A61B 8/00* (2006.01)
*G01R 23/16* (2006.01)
*A61B 8/14* (2006.01)

(52) U.S. Cl. .................. 600/454; 702/76; 600/453
(58) Field of Classification Search ........... 600/453, 600/465, 454; 706/76
See application file for complete search history.

(56) References Cited

U.S. PATENT DOCUMENTS

| | | | | |
|---|---|---|---|---|
| 5,612,735 A * | 3/1997 | Haskell et al. | ............... | 348/43 |
| 5,615,680 A * | 4/1997 | Sano | ............... | 600/437 |
| 5,891,040 A * | 4/1999 | Grenon et al. | ............... | 600/455 |
| 6,447,455 B2 * | 9/2002 | Bang et al. | ............... | 600/454 |
| 6,478,742 B1 | 11/2002 | Kataoka | | |
| 6,577,967 B2 * | 6/2003 | Mo et al. | ............... | 702/76 |
| 6,638,221 B2 * | 10/2003 | Abe et al. | ............... | 600/437 |
| 6,703,835 B2 * | 3/2004 | Patch et al. | ............... | 324/307 |
| 6,733,454 B1 * | 5/2004 | Bakircioglu et al. | ............... | 600/453 |
| 6,891,370 B2 * | 5/2005 | Cline et al. | ............... | 324/307 |
| 6,976,961 B2 * | 12/2005 | Jackson et al. | ............... | 600/443 |
| 2002/0091319 A1 * | 7/2002 | Moehring et al. | ............... | 600/454 |
| 2003/0125624 A1 * | 7/2003 | Shiki | ............... | 600/443 |
| 2003/0171668 A1 * | 9/2003 | Tsujino et al. | ............... | 600/407 |
| 2004/0254467 A1 | 12/2004 | Jackson | | |
| 2005/0007115 A1 * | 1/2005 | Cline et al. | ............... | 324/309 |
| 2005/0131300 A1 * | 6/2005 | Bakircioglu et al. | ............... | 600/453 |
| 2005/0203404 A1 * | 9/2005 | Freiburger | ............... | 600/453 |
| 2006/0036174 A1 * | 2/2006 | Guracar et al. | ............... | 600/458 |
| 2006/0036175 A1 * | 2/2006 | Guracar et al. | ............... | 600/458 |
| 2006/0066306 A1 * | 3/2006 | Mistretta et al. | ............... | 324/309 |
| 2006/0173319 A1 * | 8/2006 | Sumi | ............... | 600/437 |
| 2007/0078347 A1 * | 4/2007 | Srinivasan et al. | ............... | 600/465 |

OTHER PUBLICATIONS

U.S. Appl. No. 11/202,676, filed Aug. 12, 2005.
Ghiglia, D. C. and M. D. Pritt, Two-Dimensional Phase Unwrapping: Theory, Algorithms, and Software (Wiley, New York, 1998), 16 pages.

* cited by examiner

*Primary Examiner*—Eric F Winakur
*Assistant Examiner*—Helene Bor

(57) ABSTRACT

Phase unwrapping is applied to velocity data to remove aliasing artifacts. Phase unwrapping is applied on multidimensional regions of velocity data. The unwrapped velocity image is displayed. The displayed image may have high sensitivity to slow motion but may also avoid aliasing of fast motion despite being undersampled.

22 Claims, 1 Drawing Sheet

PHASE UNWRAPPED VELOCITY DISPLAY FOR ULTRASOUND MEDICAL IMAGING

BACKGROUND

The present embodiments relate to imaging motion with ultrasound. Fluid motion (flow) or tissue motion is detected with ultrasound. A Doppler or correlation process estimates motion parameters such as velocity, energy or variance from received echoes. If the motion is undersampled, such as due to a long pulse repetition interval (PRI), the estimates are aliased. As the PRI decreases, the maximum depth of motion imaging may be limited. If the motion is oversampled, the sensitivity to low-velocity motion may be lost.

The PRI is increased or decreased to provide the desired sampling rate. For example, a user alters the PRI so that flow with the highest velocity in a region of interest or through a sequence is not undersampled. The user may purposefully set the PRI to undersample the highest velocities for sensitivity to low-velocity flow, resulting in aliasing of higher velocities. As another example, the PRI is adaptively updated by a processor in a medical diagnostic ultrasound imaging system. U.S. Pat. No. 6,478,742 discloses adjusting a pulse repetition frequency for automatic optimization. U.S. Pat. No. 7,288,068 also discloses automatic optimization of the PRI. However, optimizing the PRI to prevent aliasing of high-velocity flow may result in undesired decrease in low-velocity motion sensitivity.

BRIEF SUMMARY

By way of introduction, the preferred embodiments described below include methods, instructions and systems for imaging motion with ultrasound. Velocity is proportional to the phase of the first lag of the autocorrelation function of the complex signal of a train of ultrasound pulses reflected from a moving object. Phase unwrapping is applied to derive unaliased estimates of velocity. Phase unwrapping may be applied to one-dimensional, two-dimensional, three-dimensional regions or four-dimensional regions. In the four-dimensional case, three dimensions represent space and the fourth is time. Phase unwrapping is applied to the motion data. An image is generated and displayed as a function of the unwrapped velocity. The image may have high sensitivity to slow motion but may also avoid aliasing of fast motion despite being undersampled.

In a first aspect, a method is provided for imaging motion with ultrasound. Phase unwrapping is applied to a first set of phase data representing velocity in a multidimensional region. An image is generated and displayed as a function of the unwrapped velocity.

In a second aspect, a system is provided for imaging motion with ultrasound. A first processor is operable to unwrap phase representing velocities in a multidimensional region. A second processor is operable to assign image values to spatial locations associated with the phase unwrapped velocities as a function of the phase unwrapped velocities. A display is operable to generate an image from the image values.

In a third aspect, a computer readable storage medium has stored therein data representing instructions executable by a programmed processor for imaging motion with ultrasound. The instructions are for correcting velocity values with phase unwrapping, and generating a display of the corrected velocity values.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Sensitivity of displayed velocity measurements may be increased since aliased data may be displayed without the aliasing. Velocities without or with little aliasing are displayed by phase unwrapping the velocities. In addition to estimates of the projection of velocity along the ultrasound beam direction, a two-dimensional or three dimensional velocity vector of the flow can be estimated, for a given location if the region is insonified from two or more scan directions. Phase unwrapping is applied separately to the velocity data from different directions before combining them to obtain the velocity vector.

Figure 1:
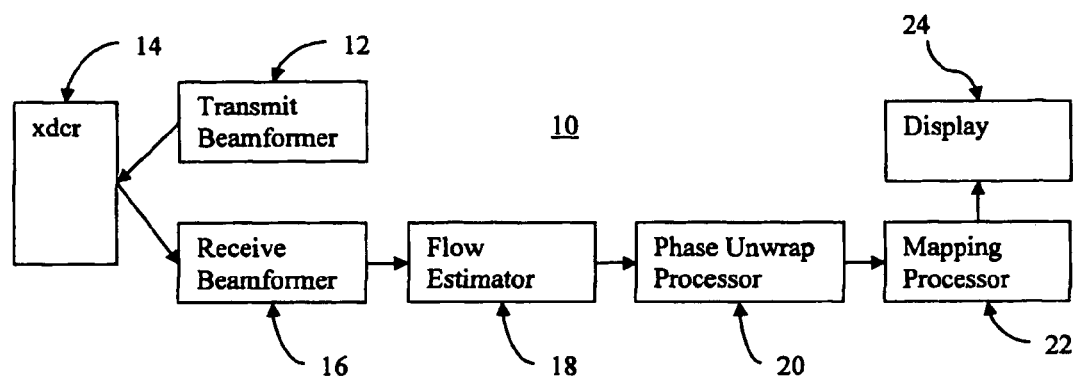
FIG. 1 is a block diagram of one embodiment of a system for motion imaging with ultrasound.

FIG. 1 shows one embodiment of a system 10 for imaging motion with ultrasound. The system 10 includes a transmit beamformer 12, a transducer 14, a receive beamformer 16, a flow estimator 18, a phase unwrap processor 20, a mapping processor 22 and a display 24. Additional, different or fewer components may be provided. For example, one or more of the components, such as the phase unwrap processor and/or the flow estimator 18, are separate and remote from the beamformers and transducers, such as in a workstation. As another example, the phase unwrap processor 20 is integrated within the flow estimator 18 or not provided. As another example, the mapping processor 22 and the phase unwrap processor 20 are a same component. Where the system 10 is a medical diagnostic ultrasound imaging system, further components connect with the phase unwrap processor or flow estimator 18, including a scan converter and a B-mode detector.

The transmit beamformer 12 generates transmit waveforms for a plurality of channels. Due to relative timing and apodization of the waveforms across the transducer array 14, one or more transmit beams are generated. Plane wave generations may alternatively be used. The transmissions are separated by a pulse repetition interval, resulting in pulses being transmitted at a pulse repetition frequency. In response to each transmission, the receive beamformer 16 applies relative delays and apodization to form samples representing one or more regions of a patient. Each sample is associated with a particular time based on the pulse repetition interval. The receive beamformer 16 generates radio frequency or in-phase and quadrature data for each sample.

The flow estimator 18 is a Doppler processor, general processor, digital signal processor, application specific integrated circuit, correlation processor, digital circuit, analog circuit, combinations thereof or other now known or later developed device for determining or estimating flow characteristics. A clutter filter for minimizing low velocity tissue may be included. The flow estimator 18 estimates velocities, energy, and/or variance from the sequence of signals representing a same location at different times. For a Doppler processor, the phase of the first lag of the autocorrelation function of the in-phase and quadrature components indicates the Doppler frequency shift, and the frequency shift information is converted to velocity information. The magnitude of the zeroth lag of the autocorrelation function provides energy.

The scale or range of velocities determined by the flow estimator 18 is subject to the Nyquist sampling frequency, so the pulse repetition interval or pulse repetition frequency limits the velocity scale. Increasing the pulse repetition frequency allows for a larger scale, but less low motion sensitivity. Where the velocity scale has a small range in comparison to the velocities of the flow being imaged (i.e., undersampling), some velocity values may be aliased, resulting in incorrect estimation of velocity. A $+/-2\pi$ wraparound phase error aliases some velocity data, such as high velocities.

The phase unwrap processor 20 is a general processor, a control processor, a digital signal processor, an application specific integrated circuit, a field programmable gate array, a digital circuit, an analog circuit, combinations thereof or other now known or later developed device. In one embodiment, the phase unwrap processor 20 is a single processor. The phase unwrap processor 20 may include multiple different processors implementing the same function in parallel or different functions in series. While shown as a separate device, the phase unwrap processor 20 may be implemented as a control or other processor within different components, such as a processor of the flow estimator 18, transmit beamformer 12, receive beamformer 16, a control processor for the system 10, or other now known or later developed processor within the system 10.

The phase unwrap processor 20 implements phase unwrapping processes. The phase unwrap processor 20 is operable to apply multi-dimensional phase unwrapping to a set of velocity data representing a multi-dimensional region. A frame of data representing velocities within a one-, two- or three-dimensional region is input to the phase unwrap processor 20. Using two- or three-dimensional phase unwrapping, a true phase or unaliased phase of the first lag of the autocorrelation function is calculated. One method for two-dimensional phase unwrapping treats phase as an analytic function, identifying residues separately and integrating the gradient of the phase along paths such that the integral of the gradient of the phase around the two-dimensional closed path is zero (i.e. path independence of the integral is assured). One or more initial velocity values are assumed to be or are identified as correct. For example, a user indicates an accurate velocity. As another example, a lowest velocity is used as the correct or initial velocity. In another example, a median velocity is used as the correct or initial velocity. In yet another example, the mode of the velocity distribution is used as the correct or initial velocity.

The phase unwrap processor 20 and/or another processor may further correct the velocities. Velocity information obtained from ultrasound scanning is a one-dimensional velocity representing motion towards and away from the transducer 14 along a scan line. To determine a two or three-dimensional velocity vector, velocities along two or more directions are obtained. For example, the transmit and receive beamformers 12, 16 scan from different origins on the transducer 14 or at different angles to form two or more frames of data. As another example, the transducer 14 or aperture is moved electronically or mechanically to scan the same region from different directions. After the velocities of each frame of data are phase unwrapped, the corrected velocities represent components along a given direction of a multidimensional velocity vector. By combining the corrected velocities from the different frames of data as a function of the relative angles, a multidimensional velocity vector is determined. The multidimensional velocity vector may more accurately represent the motion being imaged.

The mapping processor 22 is a general processor, a control processor, a digital signal processor, an application specific integrated circuit, a field programmable gate array, a digital circuit, an analog circuit, a look-up table, combinations thereof or other now known or later developed device for assigning imaging values as a function of input data. Imaging values are RGB, YUV, gray scale, color scale or other types of display values. The mapping processor 22 is part of a scan converter, graphics processing unit, or graphics processor in one embodiment.

The mapping processor 22 assigns image values for each pixel, voxel or other spatial location represented on a screen or in a frame of data. The image values are assigned based, at least in part, on the value of the velocities representing the spatial locations. The phase unwrapped velocities, such as one, two or three dimensional velocity vector values, are mapped to a color or gray scale. Linear, nonlinear or other mapping functions may be used. In one embodiment, a look-up table linearly maps the phase unwrapped velocities to shades or hues of red and orange indicating magnitude and direction of velocity. Other maps or color scales may be used. The color scale may map to a fixed velocity range or is adjustable and spans the range of unwrapped velocities currently being displayed.

The display 24 is a CRT, LCD, projector, plasma, printer, combinations thereof or other now known or later developed device for outputting an image representing motion within the scanned region. The display 24 generates an image representing velocities or other motion values. The image includes colors corresponding to the image values mapped by the mapping processor 22. The image may be a combination of B-mode or other imaging mode data with the velocity data. For example, the velocity image values overlay or overwrite B-mode data within a region of interest. As another example, the velocity image values and other data are combined, such as combining by averaging, weighted averaging or another function. The combination of velocity values with other data may be performed prior to mapping to the image values.

Any of the components of the system may include a memory. The component is a programmed processor operable to implement instructions stored in the memory. For example, instructions are stored in a common memory for implementing processes by different processors or are stored as separate programs for implementing the different processes of each component. The instructions are for imaging flow with ultrasound. For example, the storage medium includes instructions for correcting velocity values with multidimensional phase unwrapping. Undersampled velocity values based on the pulse repetition interval are unwrapped to provide low motion sensitivity with minimal or no aliasing. The instructions may include correcting velocities values for a same location associated with different scan directions and determining a corrected velocity vector for the location as a function of the corrected velocity values. The instructions also include generating a display of the corrected velocity values, such as by mapping colors to corrected (unwrapped) velocity values or by generating the display as a function of corrected velocity vector.

The instructions for implementing the processes, methods and/or techniques discussed above are provided on the computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, filmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

Figure 2:
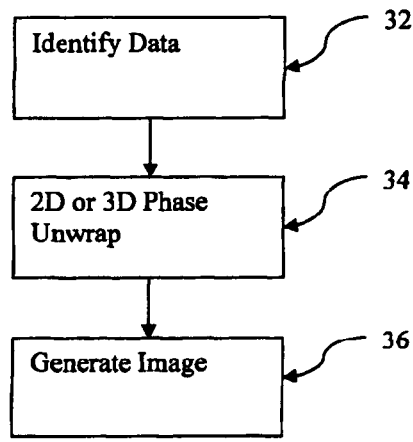
FIG. 2 is a flow chart diagram of one embodiment of a method for motion imaging with ultrasound.

FIG. 2 is a flow chart of one embodiment for imaging motion with ultrasound. The motion is of tissue or fluid. The method of FIG. 2 is implemented using the system 10 of FIG. 1 or a different system. Different, additional or fewer acts may be provided.

In act 32, velocity data is identified for phase unwrapping. The velocity data provided is responsive to either a user set or a previously determined velocity scale. The velocity data represents one or more heart cycles or a portion of one or more heart cycles. For example, the data identified for unwrapping is one or more frames of data or a region of interest associated with a peak systole portion of the heart cycle and about half of the heart cycle after peak systole. In alternative embodiments, different portions of the heart cycle are used. Velocities at peak systole are more likely associated with aliasing. Alternatively, the velocity data identified for phase unwrapping is an ongoing real-time stream of velocity data with or without relation to the heart cycle. A previously stored sequence of velocity data may be identified or selected for phase unwrapping.

In act 34, multi-dimensional phase unwrapping is applied to one or more sets of the velocity data representing one or more multi-dimensional regions. For example, two-dimensional phase unwrapping is performed to determine phase values of a set of velocity data representing a two-dimensional area. As another example, three-dimensional phase unwrapping is performed to determine the phase values of the set of velocity data representing a volume or three-dimensional region. The dimensions are spatial, but one dimension may be temporal, such as for four-dimensional imaging. The phase unwrapping is applied to one or more frames of velocity or other motion data.

Any now known or later developed multi-dimensional phase unwrapping algorithms may be used. In one embodiment applicable to 2-dimensional unwrapping, the measured or estimated phase is represented as:

$$\Phi = \arg(R(1)), \Phi \in [0, 2\pi],$$

where the desired true phase is given by:

$$\psi = \Phi + 2\pi k,$$

where R(1) is the first lag of an autocorrelation function or other phase or velocity estimate that may or may not be aliased and k is unknown integer value. To unwrap the phase or velocity values, the following integral is calculated:

$$\psi(r) = \int_c \nabla \psi \cdot dr + \psi(r_0),$$

where c is a path in 2-dimensional space connecting the current sample at location r, to a sample at location $r_0$, of a known or assumed true phase. The value of $\psi(r)$ in general depends on the choice of the path c. If a current velocity or phase for a given sample is not aliased, the true phase is the same. If the value is aliased, the true phase value is different by $2\pi$ or other multiple, k, of $2\pi$. For self-consistency, the value of the unwrapped phase is independent of the path chosen. Path independency is shown by the integral of the gradient of phases around the closed path C being zero, as given by:

$$\int_c \nabla \psi \cdot dr = 0$$

where $\nabla$ is a gradient and C is the closed path. This integral will not be equal to 0 if the sum of the residues encircled by the path is not 0. As part of 2-dimensional phase unwrapping, any phase residues are found. The residues are connected with lines that form barriers over which phase gradient integrals are not allowed. The lines between the residues are called cuts. The cuts are arranged so that an equal number of positive and negative residues are connected together by the cuts. This ensures that any closed path integral sums to zero. More than one path may be calculated for a given set of data for determining phase values for each of the velocities within the set. For a given spatial location, the gradient of the phase is integrated along a path from a known or assumed true phase value to the desired phase value. For example, the median velocity along the path, for the frame of data or within a sequence of frames of data is assumed to have a true phase value. The path starts at a location with a median velocity value. The integral of the gradient of the phase along the path provides the true phase at that spatial location provided the path does not cross a cut. As a result, an aliased value is unaliased. Phase for a plurality of locations is determined. Any aliased phase is unwrapped or corrected to a true phase. This is similar to adding or subtracting $2\pi$ to the estimated phase in 1D phase unwrapping if the difference from the previous estimate on the path is greater than $\pi$. Other two-dimensional phase unwrapping techniques are reviewed in the textbook: Ghiglia, D. C. and M. D. Pritt, Two-Dimensional Phase Unwrapping: Theory, Algorithms, and Software (Wiley, New York, 1998).

In act 36, an image is generated from phase unwrapped motion data. The motion data is responsive to the application of the multidimensional phase unwrapping, so has no or little aliasing. The velocity may be undersampled by the pulse repetition interval, but an unaliased velocity image is generated. The image values are directly or indirectly mapped from the phase unwrapped motion data. For example, color values correspond to the amplitude of the phase unwrapped motion data. In another example, the image values correspond to a combination of different data, such as phase unwrapped velocity values and B-mode information. As another example, the color values correspond to a magnitude and/or orientation of a velocity vector derived from phase unwrapped motion data.

In another embodiment, a velocity vector is determined prior at act 36 and after act 34. Velocity data in a plurality of sets of data are multidimensionally phase unwrapped. Each set of data represents the same or an overlapping multidimensional region, but is associated with a different aperture, scan line origin, scan line format or other characteristic resulting in at least one spatial location being scanned from different directions. The velocity values for each set of data are unwrapped. The velocity vector for a location is determined as a function of the unwrapped values and the related scan directions. The image values are determined from the velocity components.

The phase unwrapped velocity values may be used for other purposes than imaging. In one embodiment, one or both of the velocity scale and imaging frequency are set as a function of the results of the phase unwrapping in act 34, such as disclosed in U.S. Pat. No. 7,288,068, the disclosure of which is incorporated herein by reference. The pulse repetition interval or other velocity scale characteristic is calculated from the phase unwrapped velocity information. The pulse repetition interval provides a minimum velocity scale that does not alias. One or combinations of multiple of baseline, parameters for auto-Doppler tracking, persistence, spatial filters, thresholds, and clutter filters may be set. The images are generated from phase unwrapped velocity values to reduce or remove any aliasing even though the velocity scale may be based on feedback from any aliasing of the highest velocity values.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and the scope of this invention.

We claim:

1. A method of imaging motion with ultrasound, the method comprising:
   setting a pulse repetition interval used throughout an entire scan in a first direction;
   applying a multidimensional phase unwrapping to a first set of ultrasound motion data representing a multidimensional region;
   the phase unwrapping being without data acquired with a different pulse repetition; and
   generating an image from phase unwrapped ultrasound motion data.

2. The method of claim 1 wherein applying to the first set of ultrasound motion data comprises applying to a frame of velocity data.

3. The method of claim 1 wherein applying multidimensional phase unwrapping comprises determining a two dimensional phase unwrapping to each value of the first set of ultrasound motion data, the multidimensional region being an area.

4. The method of claim 1 wherein applying multidimensional phase unwrapping comprises determining a three dimensional phase unwrapping to each value of the first set of ultrasound motion data, the multidimensional region being a volume.

5. The method of claim 1 further comprising:
   identifying the first set of ultrasound motion data prior to applying the multidimensional phase unwrapping, the identified first set of ultrasound motion data being associated with a systole period of a heart cycle;
   wherein applying comprises applying to the identified first set of ultrasound motion data.

6. The method of claim 1 wherein generating the image comprises generating the image without aliasing wherein the ultrasound motion data is undersampled as a function of the pulse repetition interval.

7. The method of claim 1 wherein generating the image comprises mapping the phase unwrapped ultrasound motion data to a color scale.

8. The method of claim 1 further comprising:
   applying multidimensional phase unwrapping to a second set of ultrasound motion data representing the multidimensional region, the second set of ultrasound motion data corresponding to a second scan direction different than the first scan direction; and
   determining velocity values for each of a plurality of locations in the multidimensional region, each velocity value being a function of phase unwrapped ultrasound motion data from the first and second sets of motion data;
   wherein generating the image comprises generating the image from the velocity values.

9. A system for imaging motion with ultrasound, the system comprising:
   a first processor operable to unwrap phase representing velocities in a multidimensional region, the phase corresponding to ultrasound motion data acquired by setting a pulse repetition interval used throughout an entire scan, the unwrapping of phase using a velocity value from the scan as having a true phase;
   a second processor operable to assign image value to spatial locations associated with the phase unwrapped velocities as a function of the phase unwrapped velocities; and
   a display operable to generate an image from the image values.

10. The system of claim 9 wherein the multidimensional region is an area and the first processor is operable to unwrap phase two dimensionally.

11. The system of claim 9 wherein the multidimensional region is a volume and the first processor is operable to unwrap phase three dimensionally.

12. The system of claim 9 wherein the velocities are undersampled as a function of the pulse repetition interval.

13. The system of claim 9 wherein the second processor comprises a look-up table operable to map the phase unwrapped velocities to a color scale of the image values.

14. The system of claim 13 where the color scale corresponds to a fixed velocity range.

15. The system of claim 13 where the color scale is adjustable and spans the range of unwrapped velocities currently being displayed.

16. The system of claim 9 wherein the first processor is operable to unwrap phase multidimensional of velocities representing the same locations of the multidimensional region from different interrogation directions and is operable to determine the velocity vector as a function of two or more unwrapped velocities for each of the locations.

17. In a computer readable storage medium having stored therein data representing instructions executable by a programmed processor for imaging motion with ultrasound, the storage medium comprising instructions for:
   correcting velocity values with multidimensional phase unwrapping, each velocity value being a function of phase unwrapped ultrasound motion data acquired at a same pulse repetition interval for a scan and one of the velocity values being used for phase unwrapping as an unaliased velocity; and
   generating a display of the corrected velocity values.

18. The storage medium of claim 17 wherein the velocity values are undersampled as a function of the pulse repetition interval.

19. The storage medium of claim 17 wherein generating the display comprises mapping colors to the corrected velocity magnitude.

20. The storage medium of claim 19 where the color scale correspond to a fixed velocity range.

21. The storage medium of claim 19 where the color scale is adjustable and spans the range of unwrapped velocities currently being displayed.

22. The storage medium of claim 18 wherein correcting the velocity values comprises correcting velocities values for a same location associated with different scan directions;

further comprising:

determining a corrected velocity vector for the location as a function of the corrected velocity values;

wherein generating the display comprises generating the display as a function of the corrected velocity vector.

* * * * *